United States Patent [19]

Fujiura et al.

[11] Patent Number: 4,699,249
[45] Date of Patent: Oct. 13, 1987

[54] LUBRICATION SYSTEM FOR POWER TRANSMISSION CHAIN

[75] Inventors: Kaiya Fujiura, Nishio; Yoichi Hayakawa, Toyoake; Yoshiharu Harada; Kagenori Fukumura, both of Toyota, all of Japan

[73] Assignees: Aisin-Warner Limited; Toyota Jidosha Kabushiki Kaisha, both of Japan

[21] Appl. No.: 813,599

[22] Filed: Dec. 26, 1985

[30] Foreign Application Priority Data

Dec. 26, 1984 [JP] Japan .................. 59-279888

[51] Int. Cl.$^4$ ............ F01M 9/06; F16N 7/26
[52] U.S. Cl. ................. 184/11.1; 184/11.2; 184/15.1; 474/91
[58] Field of Search ............ 184/6.12, 11.1, 11.2, 184/15.1, 13.1, 6.3; 74/467, 468, 606 A; 474/91, 43

[56] References Cited

U.S. PATENT DOCUMENTS

| | | | |
|---|---|---|---|
| 1,565,103 | 12/1925 | Randles | 184/11.1 |
| 1,960,693 | 5/1934 | Bryant | 474/91 |
| 2,186,808 | 1/1940 | Pilkington | 474/91 |
| 2,590,870 | 4/1952 | Keese | 184/6.12 |
| 2,783,654 | 3/1957 | Carnell | 474/91 |
| 3,065,822 | 11/1962 | McAfee | 184/11.1 |
| 3,441,106 | 4/1969 | Taylor et al. | 184/6 |
| 3,785,458 | 1/1974 | Caldwell | 184/6.12 |
| 4,015,483 | 4/1977 | Warner | 474/91 |
| 4,231,266 | 11/1980 | Nishikawa | 184/11.1 |
| 4,271,717 | 6/1981 | Millward et al. | 74/467 |
| 4,429,587 | 2/1984 | Finn | 184/6.12 |
| 4,526,054 | 7/1985 | Ehrlinger | 74/467 |
| 4,539,865 | 9/1985 | Yoneda et al. | 74/606 R |
| 4,630,711 | 12/1986 | Levrai | 184/11.1 |

FOREIGN PATENT DOCUMENTS

| | | | |
|---|---|---|---|
| 57-22455 | 2/1982 | Japan | 74/606 R |
| 59-13163 | 1/1984 | Japan | 74/606 R |

Primary Examiner—Leonard E. Smith
Assistant Examiner—Jane E. Obee
Attorney, Agent, or Firm—Steele, Gould & Fried

[57] ABSTRACT

A lubricating system for a transmission of the kind having a driving shaft driven to rotate, a transmission shaft disposed parallel to the driving shaft, a chain for transmitting power from the driving shaft to the transmission shaft and a chain case enclosing the chain, the lubricating system comprising a chain chamber and an oil reservoir chamber in the chain case, the oil reservoir chamber having an upper inlet port for receiving oil from the chain chamber, at least some of the oil in the chain chamber being driven to reach the inlet port by movement of the chain, and the oil reservoir chamber having a lower outlet port for returning oil to the chain chamber, whereby oil flowing through the oil reservoir chamber may be cooled and the amount of oil in the chain chamber subject to agitation by the chain movement at any one time may be reduced, substantially prolonging the operational life of the lubricating oil. When the transmission is further provided with a support part for the transmission shaft and a rotatable bearing assembly disposed between the support part and the transmission shaft, the lubricating system may further comprise the support part having a passage therein forming part of a flow path along which oil moves from an upper part of the oil reservoir to a lower part of the oil reservoir, the rotatable bearing assembly being disposed adjacent one end of the passage, whereby the rotatable bearing assembly is continuously lubricated by oil flowing through the oil reservoir.

6 Claims, 1 Drawing Figure

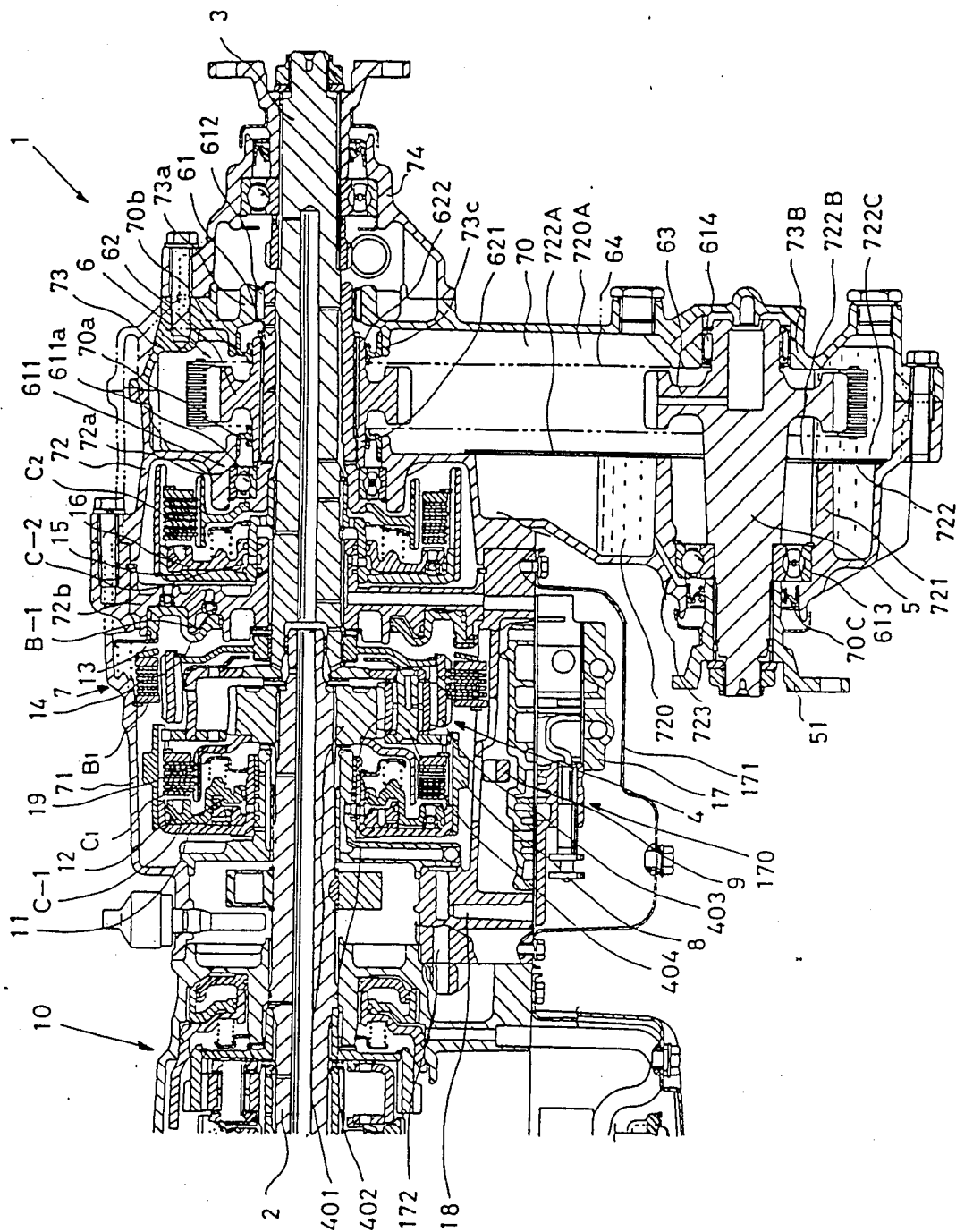

LUBRICATION SYSTEM FOR POWER TRANSMISSION CHAIN

BACKGROUND OF THE INVENTION

1. Field of the Invention

This invention relates to the field of power transmissions in general, and in particular, to a lubrication system for a chain for transmitting power from a driving shaft to a transmission shaft disposed parallel to the driving shaft.

2. Description of Prior Art

Certain transmissions transmit power from a driving shaft (driven for example by an engine or another transmission) to a transmission shaft disposed parallel to the driving shaft and below the driving shaft, by means of a chain drive. In such transmissions, the interior of a chain case has been separated from the interior of the rest of the transmission case and an appropriate amount of a lubricating oil has been sealed in the chain case so that the lower end of the chain moves through the lubricating oil. This arrangement avoids the problems of too much oil flowing into the chain case from the exterior, but usually with the result that either excess oil collects in the chain case or too much chain-lubricating oil contained in the chain case flows out to the exterior, resulting in insufficient amounts of the oil remaining in the chain case.

Use of a sealed chain case as in the prior art has the drawbacks that the lubricating oil collected in the chain case is stirred by the chain, resulting in a rise in the oil temperature. A rise in the oil temperature causes deterioration of certain oil seal parts provided for the chain case and/or degradation of the viscosity of the lubricating oil itself, leading to insufficient lubrication of the chain and bearings and the associated structure. Although the rise in the oil temperature can be avoided by reducing the volume of the lubricating oil, so as to reduce the amount of the oil stirred by the chain, the reduction in the amount of the lubricating oil also causes the problem of premature deterioration of the oil.

SUMMARY OF THE INVENTION

An object of this invention is to provide a lubricating system for a power transmission chain wherein the temperature of lubricating oil in the chain case does not rise, thereby maintaining the performance of the lubricating oil for a long time.

According to this invention, there is provided a lubricating system for a power transmission chain in a vehicular transmission having a driving shaft driven to rotate, a transmission shaft disposed in parallel with the driving shaft, a chain for transmitting power from the driving shaft to the transmission shaft, and a chain case enclosing the chain, comprising an oil reservoir in the chain case in which the lubricating oil is collected by the drive of the chain and which has an outlet port for discharging the lubricating oil from a lower part thereof.

The lubrication system for a power transmission chain according to this invention thus comprises an oil reservoir chamber in the chain case, the lubricating oil being collected in the oil reservoir chamber by the drive of the chain, the oil reservoir chamber having an outlet port for discharging the lubricating oil from a lower part thereof. With such an oil reservoir chamber, the lubricating oil stirred by the drive of the chain can be contained in the oil reservoir chamber, the lubricating oil in an amount required for lubricating the chain can flow out through the outlet port, and the amount of the lubricating oil stirred by the drive of the chain can be reduced, thereby preventing the oil temperature from rising. In addition, a sufficient volume of the lubricating oil can be stored in the oil reservoir chamber, and the properties of the lubricating oil can be maintained for a long time.

Other objects, features and advantages of the invention will become apparent from the following detailed description.

BRIEF DESCRIPTION OF THE DRAWING

The FIGURE shows a cross-sectional view of an auxiliary transmission (so-called "transfer"/mechanism) equipped with the lubricating system for a power transmission chain according to this invention; the view being taken transversely of the longitudinal axis.

DETAILED DESCRIPTION OF THE PREFERRED EMBODIMENTS

The lubricating system for a power transmission chain according to this invention will be described with reference to the embodiment thereof shown in the drawing.

The FIGURE shows a cross-sectional view of a so-called "transfer" mechanism for a four wheel drive vehicle to which the structure for lubricating a power transmission chain according to this invention is applied. Such transmissions often offer "on-demand" four wheel drive, providing (1) front or rear wheel drive, or (2) four wheel drive, at the driver's control.

The transfer mechanism 1 comprises an input shaft 2 formed by the output shaft of a main transmission 10 having a speed (gear) change structure connected at a front part (at the left-hand part in the FIGURE), a first output shaft 3 for driving rear wheels which is provided in series (axially aligned) with the input shaft 2, a planetary gearing 4 disposed between the input shaft 2 and the first output shaft 3 and a second output shaft 5 for driving front wheels, which is provided parallel to the first output shaft 3 (at the right side in the FIGURE), so that the case components are aligned coaxially with each other.

The transmission structure 6 is enclosed in the chain case 70 formed at a rear part of the front-side link case 72 and a front part of the rear-side link case 73, and comprises a sleeve 61 rotatably and externally fitted to the outer periphery of the first output shaft 3, a sprocket wheel 62 provided on the outer periphery of the sleeve 61, and a sprocket 63 formed integrally with the outer periphery of the second output shaft 2 in alignment with the sprocket wheel 62 to the sprocket 63. In order that the sleeve 61 be slidably supported on the outer periphery of the first output shaft 3, the inner periphery thereof, on the front end side, is slidably loosely fitted to the outer periphery on an inner cylinder of a hydraulic cylinder 15 for a clutch C2 having an annular shape. The outer periphery of sleeve 61 is supported on the inner periphery of a support part 72a of the front-side link case 72 through a ball bearing assembly 611. On the rear end side, the inner periphery of sleeve 61 is rotatably loosely fitted to the outer periphery of the first output shaft 3, and the outer periphery thereof is supported on the inner periphery of a support part 73a of the rear-side link case 73 through a roller bearing assembly 612.

The sprocket wheel 62 is spline-fitted to the outer periphery of the sleeve 61 and is provided on the front side thereof with a spacer 621 making contact with an inner race 611a of the ball bearing assembly 611 to position the sprocket wheel 62, and is provided on the rear side thereof with a tubular extension part 622 formed integrally therewith. An oil seal 70a is provided between the spacer 621 and the support part 72a of the front-side link case 72, and an oil seal 70b is provided between the extension part 622 and a boss part 73c of the rear-side link case 73. Boss part 73c is coaxial with the first output shaft 3 and extends forwardly in a tubular form, whereby a working fluid is prevented from flowing into the chain case 70 and lubricating oil contained in the chain case 70 is prevented from flowing out of the case 70.

The second output shaft 5 is rotatably mounted, on the front-side by the front-side link case 72 through the ball bearing assembly 613 and on the rear-side by the inner periphery of a boss part 73B provided in the rear-side link case 73 through a roller bearing assembly 614. A sleeve yoke 51 for transmitting power to a front axle is spline-fitted to the front part of shaft 5. An oil seal 70C is provided between the sleeve yoke 51 and the front-side link case 72. Oil seal 70c prevents the lubricating oil in the chain case 70 from flowing out to the exterior.

A preferred embodiment of the invention for lubricating a power transmission chain is applied to the lubrication of the chain 64, which is used for transmitting power from the first output shaft 3 to the second output shaft 5, and is disposed in the chain case 70. The front-side chain case 72 is provided with a tubular or annular boss part 721 at the position of the outer periphery of the second output shaft 5. A plate 722 is fastened to the tubular boss part 721 from the rear side by bolts (not shown) to form a substantially annular oil reservoir chamber 720 defined by the front-side link case 72, the plate 722 and the outer annular periphery of the boss part 721. A chain chamber 720A for the chain 64 is provided in the chain case 70 apart from the oil reservoir chamber 720. The plate 722 has a lubricating oil inlet port 722A opened wide at an upper part thereof, a shaft fitting hole 722B provided at the position of the inner periphery of the tubular boss part 721 in order to accommodate the second output shaft 5, and an outlet port 722C provided at the lower end thereof for communicating the lubricating oil to a lower part of the chain chamber 720A. An outlet passage 723 communicates from the oil reservoir chamber 720 to a point between the ball bearing assembly 613 and the oil seal 70c at a position above the tubular boss part 721.

That portion of the lubricating oil brought up by the chain 64 reaching the inlet port 722A flows into the oil reservoir chamber 720 and is stored there, whereby the amount of the lubricating oil otherwise in the chain chamber 720A is reduced, and the stirring of the lubricating oil by the movement of chain 64 is suppressed. During vehicle movement, the lubricating oil stored in the annular oil reservoir chamber 720 is cooled, for example, by exchanging heat with the outside air through cooling fins provided on the chain case 70, and is thereafter gradually returned into the chain chamber 720A through the outlet port 722C and passage 723. The cooled lubricating oil flowing out through the outlet port 722C provided in the plate 722 is supplied directly into the chain chamber 720A, while the cooled lubricating oil flowing out through the passage 723 provided at the tubular boss part 721 is supplied into the chain chamber 720A indirectly after performing forced lubrication for the ball bearing assembly 613 and the oil seal 70c.

The clutch C1 is disposed on the side of the transfer case 7 of the planetary gearing 4, and comprises a wet-type multiple-disk friction clutch for engagement and disengagement of the sun gear 401 and the carrier 404. The clutch C1 is connected to the carrier 404, and makes frictional contact with a parking gear 8 at an outer peripheral side part thereof. A holdfast 9 is engaged to the parking gear 8 when a shift lever of an automatic transmission is shifted to a parking position. The clutch C1 comprises a clutch piston 12 fitted in a hydraulic cylinder 11 connected to the carrier 404, and is operated by a hydraulic servo C-1.

The brake B1 is a wet-type multiple-disk friction brake for engaging the ring gear 403 to the auxiliary speed change gear case 7, and comprises a brake cylinder 13 provided on one side surface of a center support 72b and a brake piston 14 fitted in the brake cylinder 13, being operated by a hydraulic servo B-1.

The clutch C2 is a wet-type multiple-disk friction clutch for engagement and disengagement of the first output shaft 3 connected to the carrier 4 and the sleeve 61 of the transmission mechanism 6 for driving the second output shaft 5. The clutch C2 comprises a hydraulic cylinder 15 rotatably supported on the outer periphery of an inner cylinder of the center support 72b and a clutch piston 16 fitted in the hydraulic cylinder 15, and is operated by a hydraulic servo C-2.

A transfer valve body is denoted by reference numeral 17 and is provided with a transfer hydraulic controller 170 for supplying the working fluid to and discharging the working fluid from the hydraulic servos C-1, C-2 and B-1 for the clutch C1, the clutch C2 and the brake B1 in the transfer mechanism 1 for four wheel drive, and reference numeral 171 denotes an oil pan. The working fluid supplied to the hydraulic servos C-1, C-2 and B-1 is led to the transfer valve body 17 provided in the transfer hydraulic controller 170 through a communicating passage 172 provided in the main speed change gear case and the transfer case 7.

In the normal running of the vehicle, a line pressure is supplied to the hydraulic servo C-1 through the passage 18 to engage the clutch C1, while the pressure is relieved from the hydraulic servos B-1 and C-2 to release the brake B1 and the clutch C2. As a result, the sun gear 401 and the carrier 404 in the epicyclic gearing 4 are coupled to each other. The power is thus transmitted from the input shaft 2 to only the first output shaft 3, with a reduction gear ratio of 1, and a two-wheel-drive running condition is obtained in which only the rear wheels are driven by the power. In this case, the power supplied from the input shaft 2 is transmitted to the first output shaft 3 through a connecting member 19 fixed to the sun gear 401, the clutch C1 and the carrier 404, without being transmitted through the pinion 402 or ring gear 403.

When the driver desires four-wheel-drive running, a shift lever (not shown) provided at or near the driver's seat or the like is manually shifted, and the transfer hydraulic controller 170 is operated to gradually supply the line pressure to the hydraulic servo C-2. When the clutch C2 is engaged, the first output shaft 3 and the sleeve 61 are rotated at the same speed, power is transmitted to the second output shaft 5 through the sprocket wheel 62, the chain 64 and the sprocket 63, and the power is transmitted from the input shaft 2 to the first output shaft 3 and the second output shaft 5 with a reduction gear ratio of 1, resulting in the four-wheel-drive running condition. During the four-wheel-drive running, when the shift lever is manually shifted to increase output torque, as on a steep slope, the line pressure is gradually supplied to the hydraulic servo B-1, and the hydraulic pressure in the hydraulic servo C-1 is relieved with appropriate timing, whereby the brake B1 is engaged and the clutch C1 disengaged. As a result, the sun gear 401 and the carrier 404 are released and the ring gear 403 is fixed to the transfer case 7. The power is thus transmitted from the input shaft 2 to the first output shaft 3 and the second output shaft 5 with a speed reduction through the sun gear 401, the pinion 402 and the carrier 404, and a low-speed-four-wheel-drive condition with a high reduction gear ratio is obtained.

Table 1 shows setting ranges in manual shifting of the transfer 1, the engagement or disengagement of the clutches C1 and C2 and the brake B1, and the running condition of the vehicle. The number "0" indicates the engaged condition of the frictional engagement element, and the letter "X" indicates the disengaged condition of the element. The reduction gear ratio r represents, for the planetary gearing 4: the number of teeth of the sun gear 401 divided the number of teeth of the ring gear 403.

TABLE 1

| Selected range in manual shifting | Running condition | Frictional engagement elements | | | Reduction gear ratio |
| --- | --- | --- | --- | --- | --- |
| | | C1 | B1 | C2 | |
| $H_4$ | direct-connected two wheel drive | 0 | X | X | 1 |
| $H_4$ | direct-connected four wheel drive | 0 | X | 0 | 1 |
| $L_4$ | four wheel drive with speed reduction | X | 0 | 0 | $1 + 1/r$ |

In summary, a lubricating system for a transmission of the kind having a driving shaft driven to rotate, a transmission shaft disposed parallel to the driving shaft, a chain for transmitting power from the driving shaft to the transmission shaft and a chain case enclosing the chain, comprises a chain chamber and an oil reservoir chamber in the chain case, the oil reservoir chamber having an upper inlet port for receiving oil from the chain chamber, at least some of the oil in the chain chamber being driven to reach the inlet port by movement of the chain, and the oil reservoir chamber having a lower outlet port for returning oil to the chain chamber, whereby oil flowing through the oil reservoir chamber may be cooled and the amount of oil in the chain chamber subject to agitation by the chain movement at any one time may be reduced, substantially prolonging the operational life of the lubricating oil. When the transmission is further provided with a support part for the transmission shaft and a rotatable bearing means disposed between the support part and the transmission shaft, the lubricating system further comprises the support part having a passage therein forming part of a flow path along which oil moves from an upper part of the oil reservoir to a lower part of the oil reservoir, the rotatable bearing means being disposed adjacent one end of the passage, whereby the rotatable bearing means is continuously lubricated by oil flowing through the oil reservoir. In a presently preferred embodiment, the lubricating system comprises a plate in the chain case forming a wall between the chain chamber and the oil reservoir, the inlet and outlet ports being formed by apertures in the wall. The wall is typically disposed substantially vertically in the chain case, whereby a flow pattern is established in the chain case in which the oil flows upwardly through the chain chamber and downwardly through the oil reservoir.

Although this invention is illustrated for the chain in the transfer mechanism for on-demand four wheel drive, this invention can be applied to any transmission comprising a power transmission chain. This invention may be embodied in other forms without departing from the spirit or essential attributes thereof, and accordingly, reference should be made to the appended claims, rather than to the foregoing specification as indicating the scope of the invention.

What is claimed is:

1. A lubricating system for a transmission of the kind having a chain case with a chain chamber therein, a first shaft driven to rotate, a second shaft, a bearing in the chain case for rotatably mounting the second shaft in parallel with the first shaft, a first sprocket wheel connected to the first shaft, a second sprocket wheel connected to the second shaft, and a chain disposed in the chain case for transmitting power from the first sprocket wheel to the second sprocket wheel, the lubricating system comprising:
    an oil reservoir chamber defined by the chain case, a plate mounted inside the chain case and a boss part surrounding the second shaft, the oil reservoir chamber having an upper inlet port for receiving oil driven by movement of the chain from the chain chamber and a lower outlet port for returning oil directly to the chain chamber; and,
    an indirect flow path for oil moving from the oil reservoir chamber to the chain chamber, formed in part by a passage and by the bearing, the bearing being disposed adjacent one end of the passage,
    whereby oil flowing through the oil reservoir chamber is cooled and the amount of oil in the chain chamber subject to agitation by the chain movement at any one time is reduced, substantially prolonging the operational life of the lubricating oil, and the bearing is lubricated by oil flowing from the oil reservoir chamber to the chain chamber along the indirect flow path.

2. A lubricating system according to claim 1, wherein the chain chamber comprises an oval-shaped portion and an annular-shaped portion, and the oil reservoir chamber surrounds the annular-shaped portion, to one side of the oval-shaped portion.

3. A lubricating system according to claim 1, wherein the plate is provided with apertures, the inlet and outlet ports being formed by the apertures.

4. A lubricating system according to claim 3, wherein the plate is disposed substantially vertically in the chain case, whereby a flow pattern is established in the chain case in which the oil flows upwardly through the chain chamber by movement of the chain and downwardly by gravity through the oil reservoir chamber.

5. A lubricating system according to claim 1, wherein the chain chamber comprises an annular portion and the oil reservoir chamber is of annular form, the oil reservoir chamber surrounding the annular portion of the chain chamber.

6. A lubricating system according to claim 5, wherein the bearing forms part of the indirect flow path, between the passage and the annular portion of the chain chamber.

* * * * *